United States Patent

Onoda et al.

[11] Patent Number: 5,982,624
[45] Date of Patent: *Nov. 9, 1999

[54] IC CARD

[75] Inventors: Shigeo Onoda, Itami; Tomomi Morii, Sanda; Makoto Omori, Itami; Jun Ohbuchi, Itami; Yasuhiro Murasawa, Itami, all of Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/907,054

[22] Filed: Aug. 6, 1997

Related U.S. Application Data

[63] Continuation of application No. 08/546,773, Oct. 23, 1995, abandoned.

[30] Foreign Application Priority Data

Jun. 13, 1995 [JP] Japan ................................. 7-146307

[51] Int. Cl.⁶ ...................................................... H05K 7/14
[52] U.S. Cl. ........................ 361/737; 361/728; 361/736; 361/752; 361/803; 235/492; 439/76.1; 439/638
[58] Field of Search ..................................... 361/728, 729, 361/731, 733, 735, 737, 785, 790, 803; 235/487, 492; 439/76.1, 945, 946, 638

[56] References Cited

U.S. PATENT DOCUMENTS

| | | | |
|---|---|---|---|
| 4,780,793 | 10/1988 | Ohtsuki | 361/399 |
| 5,184,282 | 2/1993 | Kaneda et al. | 361/395 |
| 5,333,100 | 7/1994 | Anhalt et al. | 361/818 |
| 5,395,268 | 3/1995 | Okada | 439/676 |
| 5,428,535 | 6/1995 | Katsumata et al. | 361/737 |
| 5,481,432 | 1/1996 | Tsukada et al. | 361/686 |
| 5,519,571 | 5/1996 | Shieh | 361/685 |
| 5,559,932 | 9/1996 | Machida et al. | 395/114 |

FOREIGN PATENT DOCUMENTS 2269486 2/1994 United Kingdom .

OTHER PUBLICATIONS

"PC Card Standard", PCMCIA/JEIDA, Physical Specification, vol. 3, Feb., 1995.

*Primary Examiner*—Leo P. Picard
*Assistant Examiner*—Jayprakash N. Gandhi

[57] ABSTRACT

In an IC card, a frame for connecting a board for mounting electronics components is covered by upper and lower panels. A main connector for connecting the IC card to a computer is provided at one end of the frame. Further, one or more subconnectors to be connected to external systems are provided on the board and the pins of the subconnectors extend towards openings in the upper panel. The subconnectors are supported between the board and the upper panel. Thus, various kinds of subconnectors for various functions can be used with the IC card. In a modified example, a subconnector is provided opposite the main connector on the upper panel, and the pins thereof extend in a direction parallel to the board.

9 Claims, 4 Drawing Sheets ic card

IC CARD

This application is a continuation, of application Ser. No. 08/546,773 filed on Oct. 23, 1995, now abandoned.

BACKGROUND OF THE INVENTION

1. Field of the Invention

The present invention relates to an IC card.

2. Description of the Prior Art

An IC card includes a board on which electronics components having an integrated circuit, such as a memory device or the like, are mounted. The IC card also includes metallic panels covering the board, and a connector at the top and bottom sides of the IC card. In a type of IC card, a connector is provided for connecting an electronic circuit constructed on the board to a system equipment. In a different type of IC card, the top panel is expanded relative to the card's peripheral, so as to mount various types of electronics components on the board and construct a complicated circuit. This type of IC card may provide a second connector at the opposing side of the first connector for connecting the electronic circuit constructed on the board to system equipment. The above-mentioned two types of IC card are called as type 1 and type 2, respectively, according to JEIDA (Japan Electronic Industry Development Association) standards.

The IC card of type 1 is inserted into system equipment such as a computer via a connector, so that a function of the system equipment can be expanded; for example, by increasing memory capacity. The IC card of type 2 can be connected further through the rear connector to another personal computer or a telephone line, so that it can be used for various functions.

Recently, IC cards tend to be used for systems of a larger scale and for systems having many functions. Therefore, a demand exists for IC cards capable of being used for various systems. The IC card of type 2 having the rear connector beside the main connector can be connected to other equipment through the rear connector. However, even in this IC card, because the rear connector is incorporated in a resin frame, space constraints limit the number of pins thereof to about 30 pins at most. Therefore, even if the rear connector is connected to another computer or a telephone line, function is limited. Accordingly, it is desirable to provide an IC card compatible with various systems and for a variety of functions.

SUMMARY OF THE INVENTION

An object of the present invention is to provide an IC card compatible with various system and for a variety of functions.

In one aspect of the invention of IC card, a board for mounting electronics components is connected to a frame, and the frame is covered by first and second panels at both sides thereof. A first connector is mounted to an end of the frame, while one or more second connectors are mounted to the board, each comprising pins extending towards an opening provided on the first panel. Preferably, a support member is fixed to the first panel and the board, and it has an opening to receive a connector to be engaged to said second connector. Preferably, a cover member covers an opening of the second connector.

In a second aspect of IC card according to the present invention, a second connector is connected to an edge portion of the second panel extending vertically to the board. Thus, a connector can be inserted to the second connector in parallel to the principal plane of the first panel.

An advantage of the present invention is that various second connectors for various functions can be provided in an IC card.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
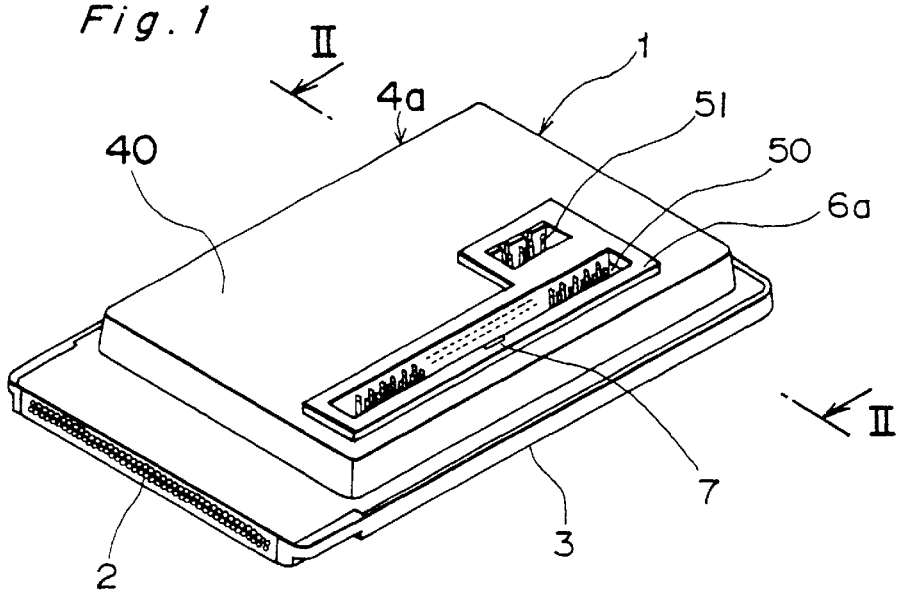
FIG. 1 is a perspective view of an IC card of a first embodiment of the invention.
Figure 2:
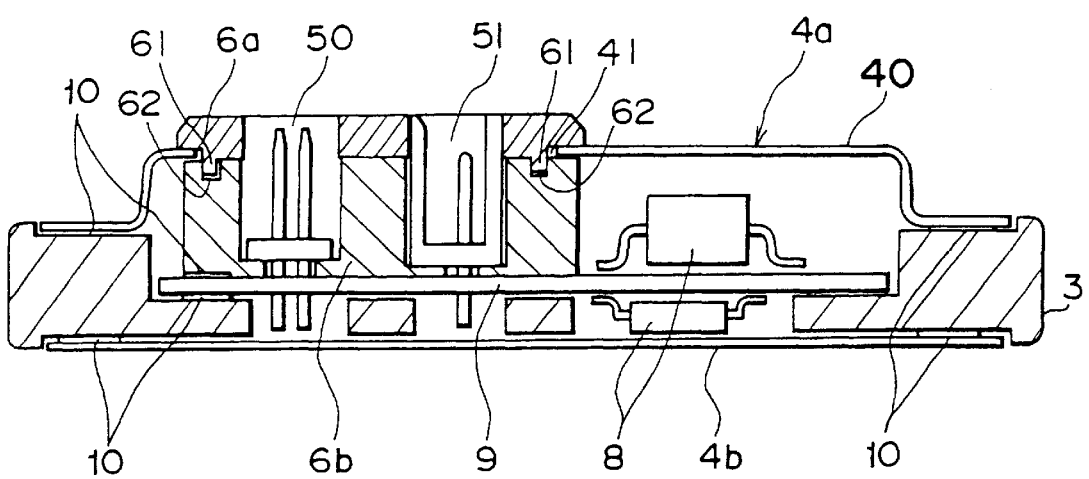
FIG. 2 is a sectional view of the IC card shown in FIG. 1.

Referring now to the drawings, wherein like reference characters designate like or corresponding parts throughout the views, FIG. 1 shows an IC card 1 of a first embodiment of the invention, and FIG. 2 shows a section along line II—II in FIG. 1. A rectangular resin frame 3 is interposed by and adhered to two metallic panels 4a and 4b from the front and rear sides. A main connector 2 for communicating signals with system equipment (not shown) such as a computer has, for example, 68 pins, and it is provided at a shorter side of the IC card 1. The resin frame 3 receives the main connector 2 at one edge thereof lateral to the longitudinal direction of the frame 3, and is fastened to a board 9 with adhesive sheets 10 between the panels 4a and 4b inside the IC card 1. Two subconnectors 50 and 51 are mounted on the board 9 next to the electronics components 8 such as an integrated circuit of a memory or a central processing unit. In this example, pins of the subconnectors 50 and 51 for connecting to outer systems are fixed directly to the board 9, and extend through openings of the upper panel 4a. The lower panel 4b is flat. On the other hand, the upper panel 4a has a projected portion except its periphery like a two stage structure, and it has a top plane 40 as a principal plane of the IC card 1 in parallel to the lower panel 4b.

The lower panel 4b and the peripheral portion of the upper panel 4a are fixed to the frame 3 with adhesive sheets 10 so as to keep the main connector 2 and the board 9 between the two panels 4a and 4b. A resin base 6b as an outer frame of the subconnectors 50 and 51 is also connected to the board 9 with adhesive sheets 10 so as to support outer connectors when they are inserted into the subconnectors 50 and 51.

The resin base 6b as an outer frame of the subconnectors 50 and 51 is located between the upper metallic panel 4a and the board 9 and has a height which fits a space between the board 9 and the upper panel 4a. The resin base 6b has an opening to receive a connector to be inserted. As explained above, the base 6b is fixed to the board 9, and the board 9 is fixed to the frame 3. Therefore, when a connector is inserted into the subconnector 50 or 51, a force for insertion can be supported by the resin base 6b. Thus, the base 6b increases mechanical reliability. If the resin base 6b were not provided, the force to connect a connector to subconnectors 50 or 51 would be exerted directly on the board 9, so that the board 9 and/or the electronics components 8 may be deformed or damaged.

Further, a resin cover 6a covers the resin base 6b so that the upper panel 4a is supported between them. The resin base 6b has also an opening to receive a connector to be inserted. The cover 6a has projections 61, while resin base 6b has holes 62 for receiving the projections 61. Thus, the cover 6a fixes edges 41 of the opening of the upper panel 4a against the resin base 6b, and also becomes an outer frame of the subconnectors 50 and 51. Then, mechanical reliability on insertion of the IC card 1 or on connection with another connector, and resistance against electrostatic charges are improved.

A means for performing correct connection or preventing erroneous connection with the subconnectors 50, 51 is provided on the resin cover 6a. If such a means is not provided, the subconnector 50, 51 and/or a connector to be connected thereto may be damaged. For example, a groove 7 is formed around a center and along a longitudinal direction of an opening for the subconnector 50 at a position asymmetrical with respect to the longitudinal direction. By providing such means, a connector cannot be inserted in an erroneous direction into the subconnector 50, and damage of the connector and/or the subconnector 50 can be prevented. Position, number, shapes and the like of the means for preventing erroneous connection are not limited to the above-mentioned example. A similar groove may also be provided on the subconnector 51.

The two subconnectors 50 and 51 for connecting to external systems are provided on the principal plane of the IC card 1 (or the top plane 40 of the upper panel 4a in FIG. 1). Because the subconnectors 50 and 51 are provided on the wide top plane 40, the number of pins and the shape of the subconnectors can be set freely. The subconnectors are preferably arranged along the longitudinal direction of the principal plane 40 in order to increase the number of pins of the subconnector 50. On the contrary, if a subconnector is provided at an opposite edge to the main connector 2, as in the IC card of type 2 of JEIDA standards, the number of pins and the shape of the subconnector are restricted by the size of the resin frame 3.

The two subconnectors 50 and 51 may have different functions. In the example shown in FIG. 1, the subconnector 50 has two lines of fifty pins. Therefore, by using the subconnector 50, the number of pins can be greatly increased. The subconnector 50 is for example a connector for transmitting data which needs many pins but can be operated with a very low current. On the other hand, the subconnector 51 has one line of four pins. The subconnector 51 is for example a connector with a small number of pins for supplying electric power with a large current. As explained above, various kinds of subconnectors can be provided on the principal plane of the IC card 1 to expand functions of the IC card 1.

Figure 3:
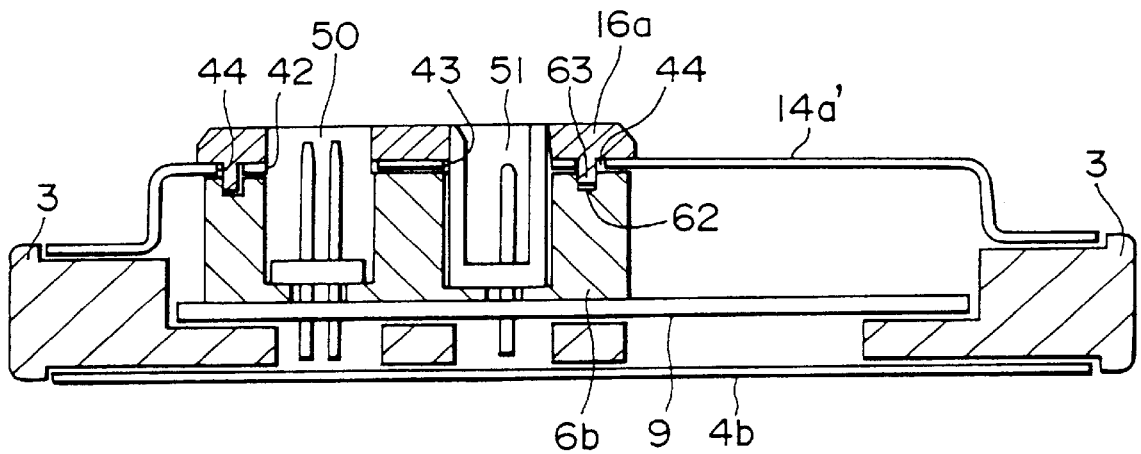
FIG. 3 is a sectional view of a modified example of the first embodiment of the invention.
Figure 4:
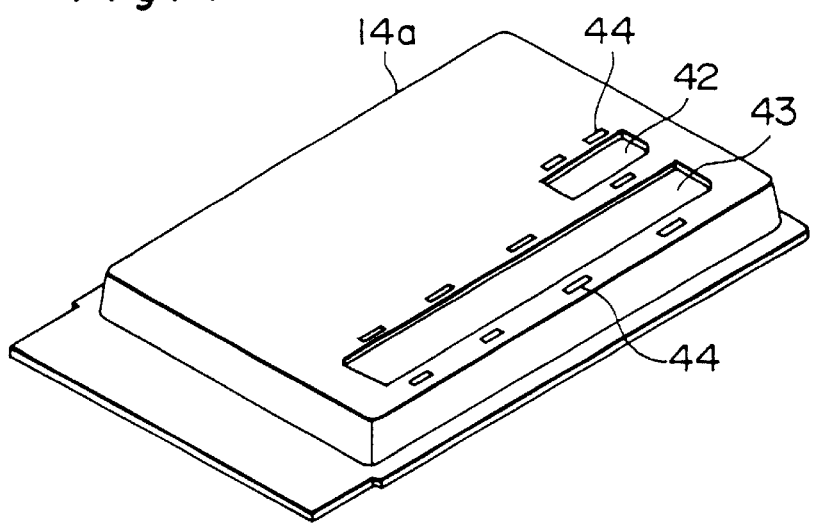
FIG. 4 is a perspective view of a metallic panel of the card shown in FIG. 3.

FIG. 3 shows a modified example of the IC card which is the same as that shown in FIG. 1 except for a resin cover 16a and an upper metallic panel 14a. FIG. 4 is a perspective view of the upper panel 14a. The panel 14a has narrow openings 42, 43 surrounding just near the pins of the subconnectors 50 and 51 extending through the openings 42 and 43. The panel 14a further has holes 44 for inserting projections 63 of the cover 16a. The holes 44 are provided along the openings 42 and 43, and the projections 63 extend through the holes 44 to be fitted into the holes 62 of the base 6b, so as to fix the panel 14a between the cover 16a and to the base 6b. In the modified example, the cover 16a and the panel 14a can be fixed more securely to the base 6b, and the IC panel becomes more reliable against external mechanical force.

Figure 5:
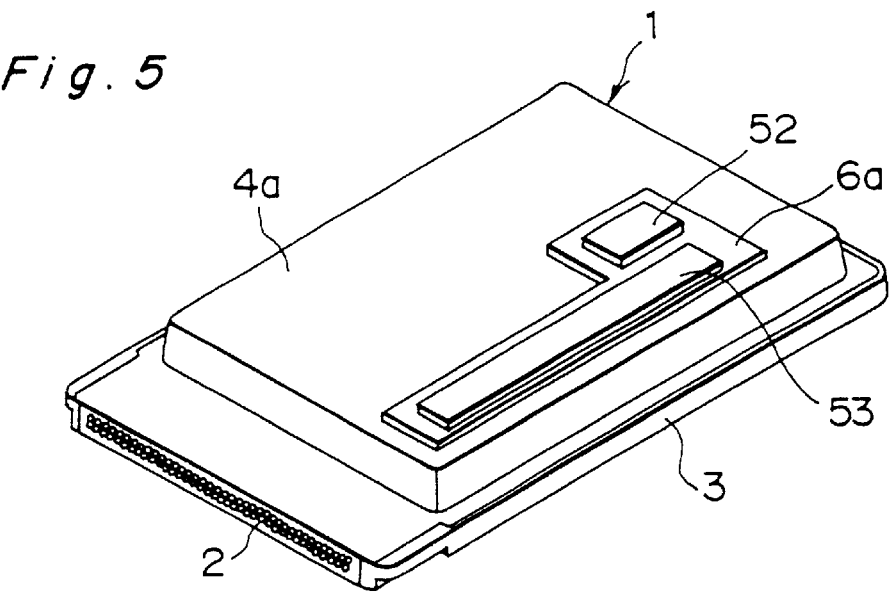
FIG. 5 is a perspective view of an IC card covered with a connector cover.

FIG. 5 shows a modified example of the IC card where connector covers 52 and 53 shield and cover the openings in the top cover 6a, shown in FIGS. 1 and 3, from dust or the like when they are not connected to an external connector. The connector covers 52 and 53 have shapes which can be press-fitted or hooked into the openings of the top cover 6a.

Figure 6:
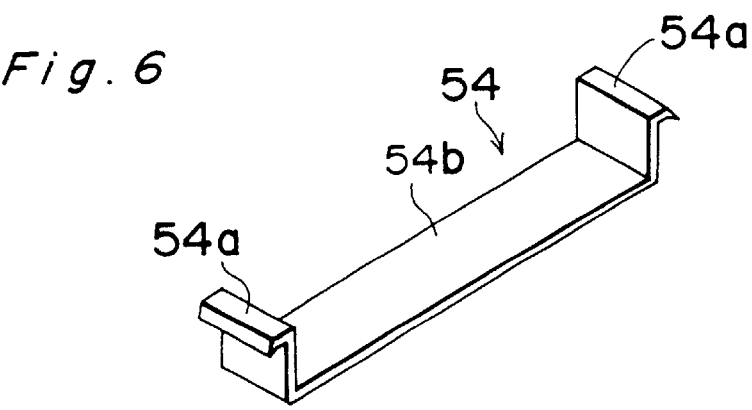
FIG. 6 is a perspective view of a modified example of the connector cover.

FIG. 6 shows a modified example of a connector cover 54 which has clamp members 54a at the two ends thereof. The clamp members 54a are bent by a right angle from a base portion 54b vertically upward so that the cover 54 can be pushed into an opening of the top cover 6a, and the tops of the clamp members 54a engaged with edges of the opening of the resin cover 6a.

The covers 52, 53, 54 prevent dust from penetrating into the subconnectors 50, 51 when the IC card is used without the subconnectors 50 and/or 51. Thus, malfunctions such as bad contact can be prevented when the subconnectors 50 and/or 51 of the IC card are used again.

Figure 7:
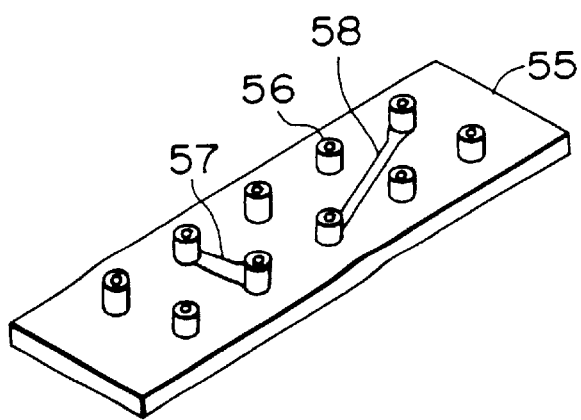
FIG. 7 is a perspective view of another modified example of the connector cover.

FIG. 7 shows another modified example of a connector cover 55 having concave metallic pins 56 which are arranged in correspondence to the array of pins of a subconnector provided on the principal plane of the IC card. The concave pins 56 can be fitted to the pins of the subconnector. The cover 55 not only covers the subconnector, but also operates as a circuit component. That is, any combination of these pins 56 can be connected electrically before actually used. Thus, the function as an IC card can be varied or modified by using the electrical connection. For example, metallization leads 57, 58 are provided between pairs of pins 56 which are needed to be short-circuited when the subconnector 50, 51 is not connected to an external system.

Figure 8:
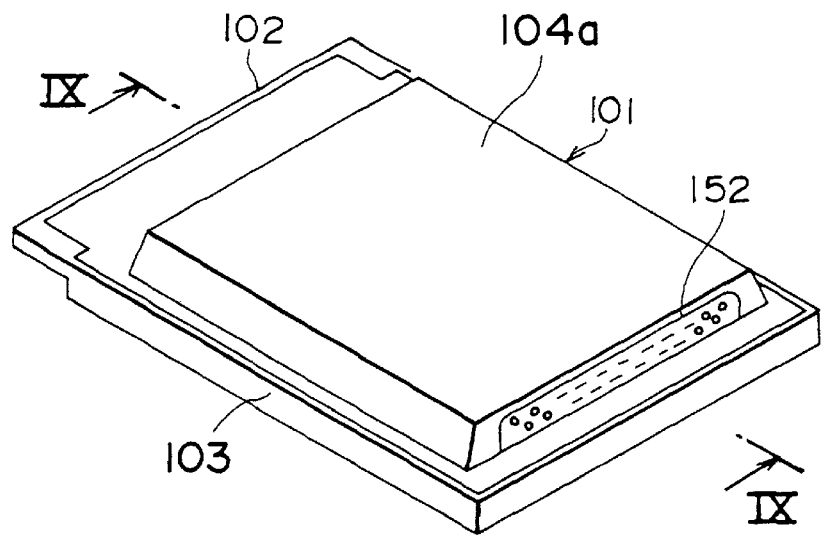
FIG. 8 is a perspective view of an IC card of a second embodiment of the invention.
Figure 9:
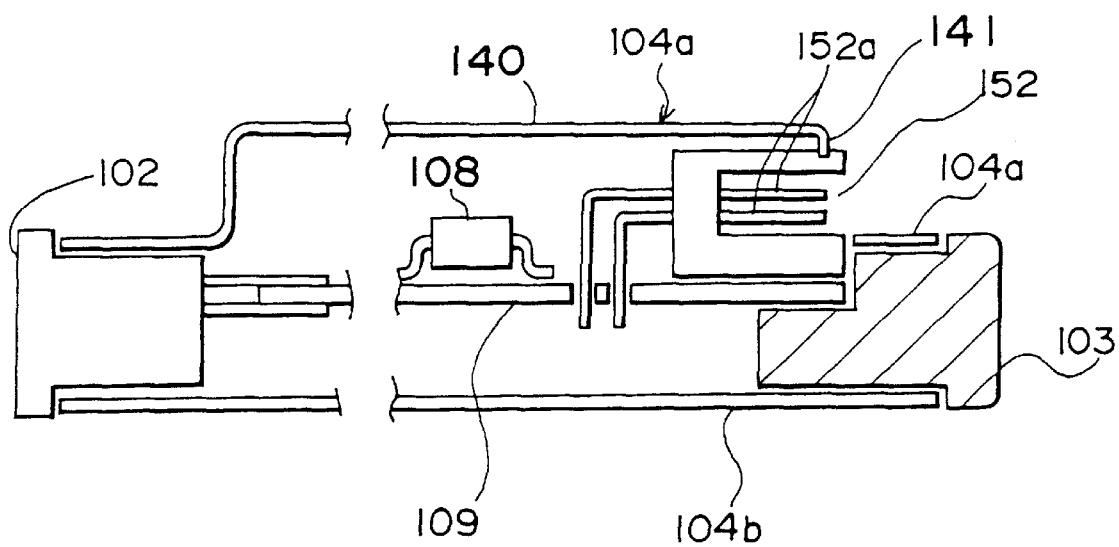
FIG. 9 is a sectional view of the IC card along D—D line in FIG. 8.

FIG. 8 shows an IC card 101 of a second embodiment of the invention from a side opposite to a main connector 102, and FIG. 9 shows a section of the IC card along line IX—IX in FIG. 8. The IC card 101 is the same as the IC card 1 shown in FIGS. 1 and 2 except for the provision of a subconnector 152 instead of the subconnector 50 and 51, the resin base 6b and the resin cover 6a. Similar to the IC card 1, a rectangular resin frame 103 is interposed by two metallic panels 104a and 104b. The upper and lower panels 104 and 104b are fixed with adhesive to the frame 103. A main connector (not shown) for communicating signals with system equipment (not shown) such a computer has for example 68 pins, and is provided at an shorter side of the IC card 101. The resin frame 103 receives the main connector 102 at one end thereof along longitudinal direction of the frame 103, while it is adhered to a board 109 in the inside of the IC card 101 provided between the panels 104a and 104b. The lower panel 104b and the peripheral portion of the upper panel 104a are adhered to the frame 103 so as to hold the main connector and the board 109 between the two panels 104a and 104b. Electronics components 108 such as an integrated circuit and a subconnectors 152 are mounted on the board 109. The lower panel 104b is flat, while the upper panel 104a has a projected portion except at its periphery like a two stage structure, having a top plane 140 as a principal plane of the IC card 101. The subconnector 152 is provided at a vertical portion 141 of the metallic upper panel 104a opposing the main connector. Pins 152a of the subconnector 152 for connecting to an outer system is fixed directly and vertically to the board 109, while they are bent by a right angle and extend in parallel to the principal plane of the panel 104a towards an opening for the subconnector 152. Because the direction of the pins 152a is in parallel to the principal plane of the upper panel 104a, an external force exerting for inserting or removing a connector into and from the subconnector 152 is in parallel to the board 109. Therefore, the mechanical reliability is good. The subconnector 152 is arranged along a shorter side of the IC card 101, and its length is limited by the length of the side. However, a connector having pins of a plurality of lines may be adopted. In the example shown in FIGS. 8 and 9, two lines of pins 152a are provided. Therefore, the number of the pins 152a can be increased. The subconnector 152 may also have a connector cover as shown in FIGS. 5–7.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An IC card comprising:
   a frame having a first and second face and a first and second end;
   first and second panels covering said first and second faces, respectively;
   a board connected to said frame between said first and second panels, electronic components being mounted on said board;
   a first socket-type connector mounted to said first end of said frame; and
   one or more second socket-type connectors for connecting to various outer systems mounted to said board including pins extending towards an opening provided in said first panel, said pins extending vertically to said board, said one or more second socket-type connectors being mounted to said board and extending substantially between said board and said first panel.

2. The IC card according to claim 1, wherein said one or more second connectors are arranged along a longitudinal direction of said IC card, and a length of said IC card is greater than a width of said IC card.

3. The IC card according to claim 1, wherein said pins of said one or more second connectors are fixed to said board.

4. The IC card according to claim 1, further comprising:
   a cover member covering an opening of said second connector.

5. The IC card according to claim 4, wherein said cover member comprises:
   a base portion; and
   clamp portions provided at two sides of said base portion, said clamp portions bending at a right angle from the base portion.

6. The IC card according to claim 4, wherein said cover member comprises:
   concave pins having an arrangement corresponding to an arrangement of the pins of said second connector; and
   at least one electrical lead connected between a prescribed pair of said concave pins.

7. An IC card comprising:
   a frame having a first and second face and a first and second end;
   first and second panels covering said first and second faces, respectively;
   a board connected to said frame between said first and second panels, electronics components being mounted on said board;
   a first connector mounted to said first end of said frame;
   one or more second connectors mounted to said board including pins extending towards an opening provided in said first panel; and
   a support member fixed to said first panel and said board, the support member having a throughhole wherein the pins of at least one of said second connectors extend therethrough, said support member having an opening to receive a connector to be engaged to said one or more second connectors.

8. The IC card according to claim 7, wherein said support member comprises:
   a base member arranged between said second connector and said board, said base member being fixed to said board; and
   a top member provided on said first panel, said base member being fixed to said top member so as to interpose said first panel between them.

9. The IC card according to claim 7, wherein said support member comprises:
   means for preventing erroneous insertion, into said second connector, of a connector to be engaged with said second connector.

* * * * *